United States Patent [19]

Okimoto et al.

[11] Patent Number: 4,554,890
[45] Date of Patent: Nov. 26, 1985

[54] ENGINE INTAKE SYSTEM

[75] Inventors: Haruo Okimoto; Ikuo Matsuda, both of Hiroshima, Japan

[73] Assignee: Mazda Motor Corporation, Hiroshima, Japan

[21] Appl. No.: 638,686

[22] Filed: Aug. 8, 1984

[30] Foreign Application Priority Data

Aug. 10, 1983 [JP] Japan ................ 58-146848

[51] Int. Cl.$^4$ ................ F02B 29/00; F02B 33/00
[52] U.S. Cl. ................ 123/26; 123/190 A; 123/559; 123/432
[58] Field of Search ................ 123/432, 559, 190 A, 123/26

[56] References Cited

U.S. PATENT DOCUMENTS

| 1,578,581 | 3/1926 | Casna ........................... 123/190 A |
| 3,948,227 | 4/1976 | Guenther ....................... 123/190 A |
| 4,315,489 | 2/1982 | Tadokoro ....................... 123/213 |
| 4,470,394 | 9/1984 | Tadokoro et al. ................ 123/432 |
| 4,484,556 | 11/1984 | Okimoto et al. ................ 123/432 |
| 4,498,429 | 2/1985 | Satow et al. ................... 123/432 |

FOREIGN PATENT DOCUMENTS

| 3232962 | 3/1983 | Fed. Rep. of Germany ...... 123/432 |
| 55-137314 | 10/1980 | Japan . |
| 56-85522 | 7/1981 | Japan . |
| 58-51221 | 3/1983 | Japan ................ 123/432 |
| 58-62314 | 4/1983 | Japan ................ 123/432 |
| 58-96017 | 6/1983 | Japan . |
| 58-124018 | 7/1983 | Japan ................ 123/432 |
| 58-122321 | 7/1983 | Japan . |

Primary Examiner—E. Rollins Cross
Attorney, Agent, or Firm—Fleit, Jacobson, Cohn & Price

[57] ABSTRACT

An engine intake system including a main intake passage leading to a combustion chamber through a main intake valve, a supercharging passage leading to the combustion chamber, and a supercharging pump provided in the supercharging passage. A rotary type timing valve is located in the supercharging passage and includes a rotor having inlet ports communicating with the supercharging passage at an upstream portion of the supercharging passage and an outlet port connected with the inlet port through a valve passage formed in the rotor. The rotor is driven in synchronism with engine rotation, the outlet port being arranged so that it is cyclically communicated with the supercharging passage at a downstream portion of the supercharging passage as the rotor rotates. There is provided a passage port provided in the downstream portion of the supercharging passage for cooperation with the outlet port in the rotor, the passage port including at least two port segments which are arranged so that one of the port segments is communicated with the outlet port in the rotor earlier than the other port segment. A shut-off valve is provided in the one port segment and movable between a closed position and an open position, a valve actuator for actuating the shut-off valve for changing opening period of the timing valve in accordance with the engine speed.

8 Claims, 6 Drawing Figures (a)

(b)

ENGINE INTAKE SYSTEM

The present invention relates to an intake system for internal combustion engines and more particularly to an intake system having an intake passage provided with a rotary type timing valve for cyclically opening the intake passage.

Conventionally, supercharged engines are being widely used in automobile industries. Such supercharged engines have superchargers for positively forcing intake air into combustion chambers to thereby increase the intake charge and consequently increase the engine output. Since such supercharged engines are generally designed so that the total amount of intake air is fed through the supercharger, problems arise in that the supercharger provides a noticeable resistance to the intake air flow under a low speed operation. The conventional supercharged engines also have problems in that the temperature of the intake air is increased resulting in a corresponding decrease in the intake charge.

In view of the above problems, there is proposed in Japanese patent application No. 54-162363 filed on Dec. 13, 1979 and disclosed for public inspection under the disclosure No. 56-85522 to form a separate supercharging passage in addition to a main intake passage and provide a supercharger only in the supercharging passage so that only a part of the intake air is positively fed to the combustion chamber. In order to prevent the supercharged air from flowing back to the main intake passage, the supercharging passage is provided with a timing valve which functions to allow the supercharging air to pass to the combustion chamber only in the final period of the intake stroke. According to the disclosures in the Japanese patent application, the timing valve is of a rotary type which is rotatably driven in synchronism with the engine rotation. The rotary valve is believed to be preferable in view of simplicity of the structure, however, it has inconveniencies in that the valve opening time is decreased in response to an increase in the engine speed so that a desired amount of intake air cannot by supplied under a high speed engine operation.

In Japanese patent application No. 54-45086 filed on Apr. 12, 1979 and disclosed for public inspection under the disclosure No. 55-137314, there is proposed to provide the supercharging passage with a poppet type timing valve which is adapted to be operated by a timing cam. The timing cam is operated through a timing control device which functions to advance the valve opening timing under a high speed engine operation than under a low speed operation. The mechanism as proposed by this Japanese application is considered as being capable of increasing the valve opening time under a high speed engine operation. However, it has an inconveniency in that it requires a complicated timing control device which renders the mechanism expensive and unreliable.

In the U.S. Pat. No. 4,315,489 issued to T. Tadokoro et. al. on Feb. 16, 1982 discloses a rotary piston engine having a supercharging passage in addition to a main intake passage. The passages are opened to the working chamber respectively through intake ports formed in a side housing. The supercharging passage is provided with a timing valve, of which timing can be changed by a centrifugal device. According to the mechanism disclosed by the U.S. patent, the opening timing of the supercharging passage to the working chamber is determined by the timing valve whereas the closing timing is determined by the intake ports making it possible to change the opening period of the supercharging passage in accordance with the engine speed. It should be pointed out, however, that the mechanism as proposed also requires a centrifugal timing control device which is complicated in structure.

It is therefore an object of the present invention to provide an intake system of a supercharged engine which has a rotary type timing valve of variable opening period.

Another object of the present invention is to provide an engine intake system having a supercharging intake passage provided with a rotary type timing valve of a simple structure but of a variable opening period.

A further object of the present invention is to provide a timing valve of a variable opening period for an engine supercharging system, which is simple in structure and less expensive.

According to the present invention, the above and other objects can be accomplished by an engine intake system including intake passage means, rotary type timing valve means located in said intake passage means and including rotatable means having inlet port means communicating with said intake passage means at an upstream portion of the intake passage means and outlet port means connected with said inlet port means through valve passage means formed in said rotatable means, means for rotating said rotatable means, said outlet port means being arranged so that it is cyclically communicated with said intake passage means at a downstream portion of the intake passage means as the rotatable means rotates, the improvement comprising passage port means provided in said downstream portion of the intake passage means for cooperation with said outlet port means in said rotatable means, said passage port means including at least two ports which are arranged so that one of the ports is communicated with said outlet port means in said rotatable means earlier than the other port, shut-off valve means provided in said one port and movable between a closed position and an open position, valve actuating means for actuating said shut-off valve means for changing opening period of said timing valve means.

The present invention is advantageously applicable to an intake system of a supercharged engine having a separate supercharging passage in addition to a main intake passage. In such an intake system, the aforementioned timing valve means and the passage port means are provided in the supercharging passage which has supercharging means. The timing valve means may then be opened later than the main intake valve which connects the main intake passage means to the combustion chamber means.

The above and other objects and features of the present invention will become apparent from the following descriptions of a preferred embodiment taking reference to the accompanying drawings, in which.

Figure 1:
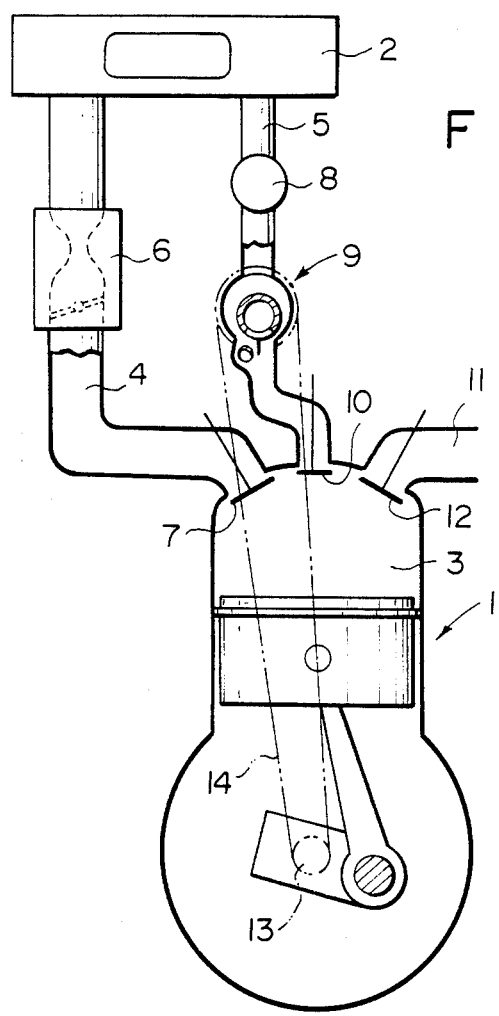
FIG. 1 is a schematic view of a supercharged engine having an intake system in accordance with one embodiment of the present invention.

Referring now to the drawings, particularly to FIG. 1, there is shown an engine 1 including a combustion chamber 3 and a main intake passage 4 extending between an air cleaner 2 and the combustion chamber 3. In the main intake passage 4, there is a carburetor 6 and a main intake valve 7 is provided between the main intake passage 4 and the combustion chamber 3. In addition to the main intake passage 4, there is provided a supercharging passage 5 which has a supercharging air pump 8 and is opening to the combustion chamber 3 through an auxiliary intake valve 10. In the supercharging passage 5, there is a rotary type timing valve 9 which is located between the air pump 8 and the auxiliary intake valve 10. Further, the engine 1 has an exhaust passage 11 which opens to the combustion chamber 3 through an exhaust valve 12. The timing valve 9 is driven in synchronism with the engine rotation by a crankshaft 13 through a timing belt 14.

Figure 2:
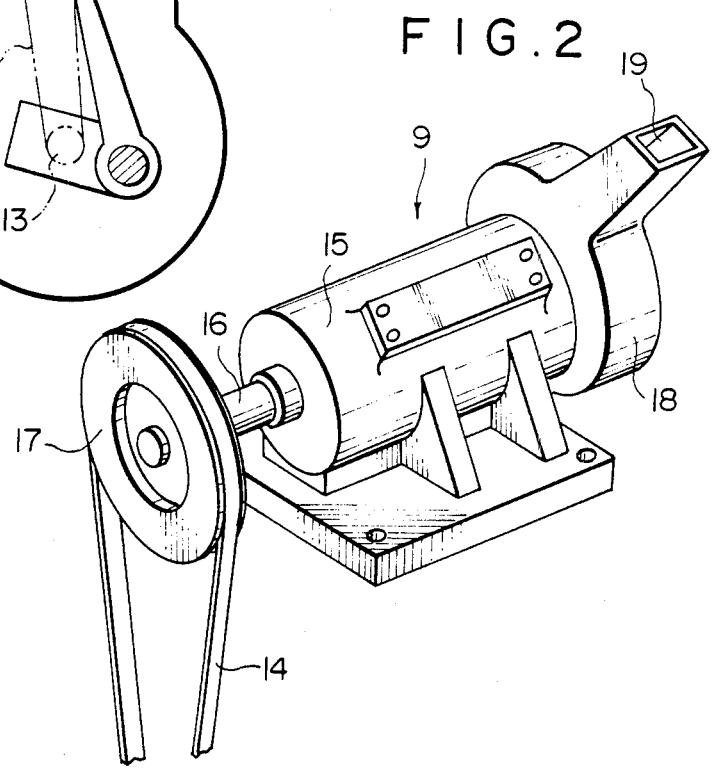
FIG. 2 is a perspective view of the timing valve employed in the embodiment shown in FIG. 1.

Referring now to FIG. 2, it will be noted that the timing valve 9 includes a cylindrical housing 15 and a driving shaft 16 extending axially outwardly from one end of the housing 15. A pulley 17 is secured to the driving shaft 16 and the aforementioned belt 14 is passed around the pulley 17. At the other end of the housing 15, there is formed an air induction housing 18 which has an inlet port 19.

Figure 3:
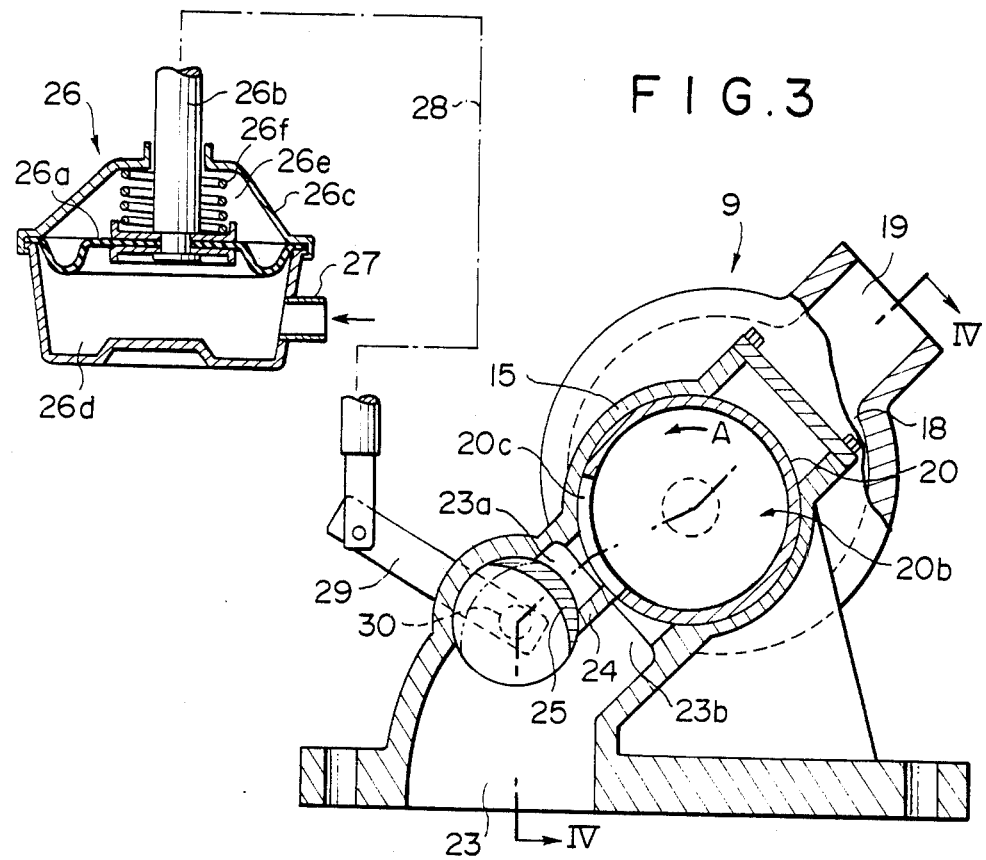
FIG. 3 is a cross-sectional view of the timing valve.
Figure 4:
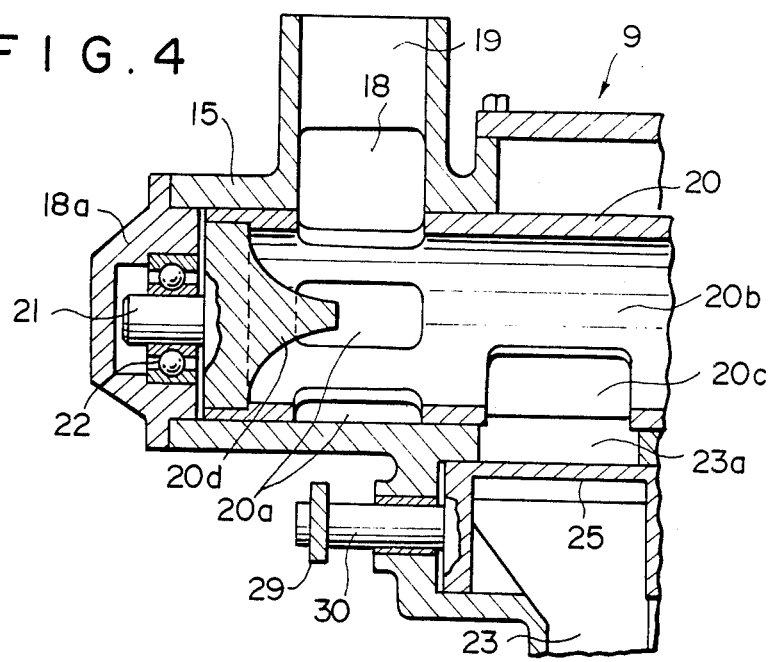
FIG. 4 is a sectional view taken substantially along the line IV—IV in FIG. 3; and, FIGS. 5 (a) and (b) are charts showing the operations of the valves used in the intake system.

As shown in FIGS. 3 and 4, a hollow cylindrical rotor 20 is provided in the housing 15. The aforementioned shaft 16 is secured to one end of the rotor 20. At the other end of the rotor 20, there is a stub shaft 21 which is supported through a bearing 22 by an end cap 18a on the air induction housing 18. The rotor 20 is formed at an end portion encircled by the induction housing 18 with a plurality of circumferentially spaced openings 20a connecting the inlet port 19 with the hollow interior 20b of the rotor 20.

The housing 15 is formed with a passage port 23 leading to the downstream portion of the supercharging passage 5. The rotor 20 has a cylindrical side wall formed with an outlet port 20c which is adapted to be cyclically brought into communication with the passage port 23. Where the timing valve 9 is designed for a multiple cylinder engine, there are provided a plurality of such outlet ports 20c and passage ports 23 which are corresponding respectively in number to the number of engine cylinders. As shown in FIG. 4, the rotor 20 is provided at an end adjacent to the inlet openings 20a with a guide member 20d for guiding the inlet air flow from the openings 20a axially toward the outlet port 20c.

As shown in FIG. 3, the housing 15 is formed at the passage port 23 with a partition wall 24 which is located at a portion adjacent to the rotor 20 and extends in an axial direction of the rotor 20 to define passage port segments 23a and 23b. The rotor 20 is rotated by the engine crankshaft 13 in the direction as shown by an arrow A and, as seen in the direction of rotation of the rotor 20, the port segment 23a is located upstream side than the port segment 23b. In the port segment 23a, there is provided a rotary type shut-off valve 25 which is movable between a closed position shown by solid lines and an open position shown by phantom lines. The valve 25 is provided with an actuating link 29 which is connected through a linkage 28 with a pneumatic actuator 26. The actuator 26 includes a casing 26c and a diaphragm 26a disposed in the casing 26c to devide the interior of the casing 26c into a pressure chamber 26d and a vent chamber 26e. The pressure chamber 26d is connected through a pipe 27 with the exhaust passage 11 so that an exhaust pressure is introduced into the chamber 26d. The vent chamber 26e is opened to the atmosphere so that the atmospheric pressure is introduced into the chamber 26e. The diaphragm 26a has a rod 26b extending outwardly through the chamber 26e and connected with the linkage 28. In the chamber 26e, there is provided a spring 26f which forces the diaphragm 26a toward the pressure chamber 26d. With this arrangement, the shut-off valve 25 is moved into the open position when the exhaust gas pressure increases beyond a predetermined value.

Figure 5:
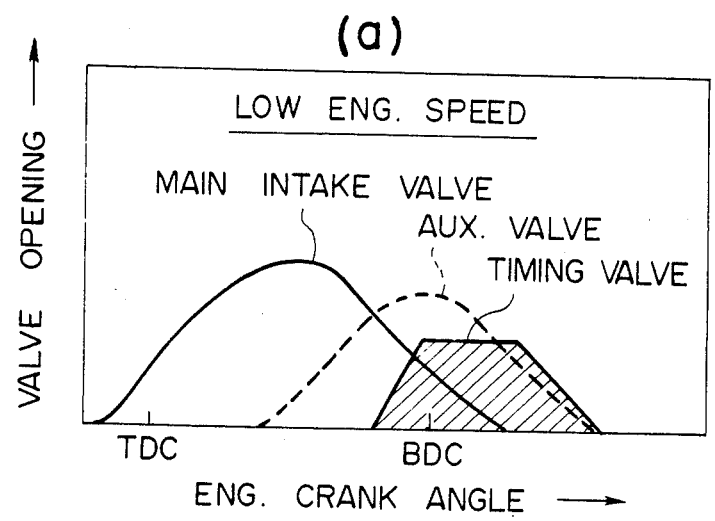
Figure 5:
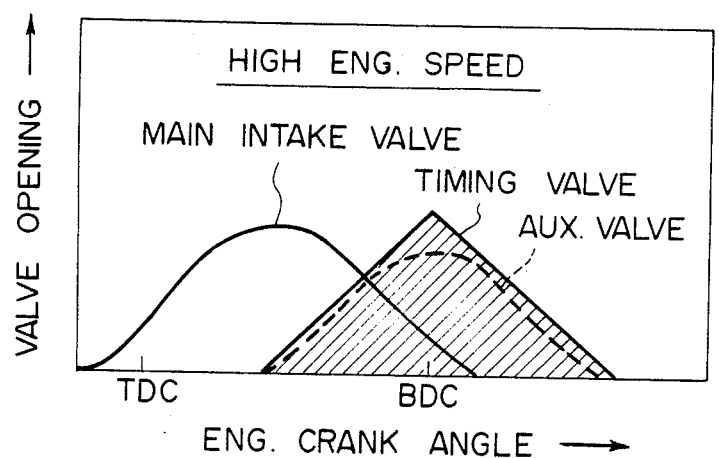

In operation, the intake mixture is introduced into the combustion chamber 3 through the main intake valve 7 which has the timing as shown in FIG. 5. The auxiliary intake valve 10 is opened at the final period of the intake stroke and closes later than the main intake valve 10 as shown by dotted lines in FIG. 5. Under a low engine speed operation, the exhaust gas pressure is low so that the shut-off valve 25 is maintained in the closed position. Therefore, the opening timing of the rotary valve 9 is retarded as shown by a shadowed area in FIG. 5(a). Thus, the supercharging air is introduced into the combustion chamber 3 at the final period of the intake stroke. At the instance wherein the timing valve 9 is opened, the main intake valve 7 is being closed so that it is possible to prevent the supercharging air from flowing back to the main intake passage 4.

Under a high speed engine operation, the exhaust pressure is high so that the shut-off valve 25 is moved by the actuator 26 to the open position. Thus, the valve opening timing is advanced and the peak valve opening is increased in the timing valve 9. It will therefore be understood that a sufficient valve opening time can be obtained even under a high rotating speed of the rotor 20. The auxiliary intake valve 10 is provided for preventing the combustion gas from flowing back to the passage 5 in the expansion stroke. It is of course possible to provide two or more partition walls 24 to define more than two passage port segments so that the valve opening timing can be incrementally changed.

The invention has thus been shown and described with reference to a specific embodiment, however, it should be noted that the invention is in no way limited to the details of the illustrated structure but changes and modifications may be made without departing from the scope of the appended claims.

We claim:

1. An engine intake system including intake passage means, rotary type timing valve means located in said intake passage means and including rotatable means having inlet port means communicating with said intake passage means at an upstream portion of the intake passage means and outlet port means connected with said inlet port means through valve passage means formed in said rotatable means, means for rotating said rotatable means, said outlet port means being arranged so that it is cyclically communicated with said intake passage means at a downstream portion of the intake passage means as the rotatable means rotates, the improvement comprising passage port means provided in said downstream portion of the intake passage means for cooperation with said outlet port means in said rotatable means, said passage port means including at least two ports which are arranged so that one of the ports is communicated with said outlet port means in said rotatable means earlier than the other port, shut-off valve means provided in said one port and movable between a closed position and an open position, valve actuating means for actuating said shut-off valve means for changing opening period of said timing valve means.

2. An engine intake system including main intake passage means leading to combustion chamber means, supercharging passage means leading to said combustion chamber means, supercharging means provided in said supercharging passage means, rotary type timing valve means located in said supercharging passage means and including rotatable means having inlet port means communicating with said supercharging passage means at an upstream portion of the supercharging passage means and outlet port means connected with said inlet port means through valve passage means formed in said rotatable means, means for rotating said rotatable means, in synchronism with engine rotation, said outlet port means being arranged so that it is cyclically communicated with said supercharging passage means at a downstream portion of the supercharging passage means as the rotatable means rotates, the improvement comprising passage port means provided in said downstream portion of the supercharging passage means for cooperation with said outlet port means in said rotatable means, said passage port means including at least two ports which are arranged so that one of the ports is communicated with said outlet port means in said rotatable means earlier than the other port, shut-off valve means provided in said one port and movable between a closed position and an open position, valve actuating means for actuating said shut-off valve means for changing opening period of said timing valve means.

3. An engine intake system in accordance with claim 2 in which said supercharging passage means is independent from said main intake passage means, said timing valve means having an opening timing which is later than an opening timing of the main intake passage means.

4. An engine intake system in accordance with claim 3 in which said supercharging passage means includes auxiliary intake valve means located downstream of said timing valve means, said auxiliary intake valve means having an opening period which is substantially the same as an opening period of the timing valve means with the shut-off valve means in the open position.

5. An engine intake system in accordance with claim 1 in which said timing valve means includes a hollow cylindrical rotor formed with inlet port means and outlet port means which are axially offset from each other, said rotor being provided at an end portion adjacent to said inlet port means with guide means for directing inlet gas from the inlet port means toward the outlet port means.

6. An engine intake system in accordance with claim 1 in which said shut-off valve means is of a rotary type.

7. An engine intake system in accordance with claim 3 in which said valve actuating means is of an engine speed responsive type which opens the shut-off valve means under a high engine speed and closes the shut-off valve means under a low engine speed.

8. An engine intake system in accordance with claim 7 in which said valve actuating means includes pneumatic actuator means which is actuated by an engine exhaust gas pressure.

* * * * *